United States Patent Office 2,947,610
Patented Aug. 2, 1960

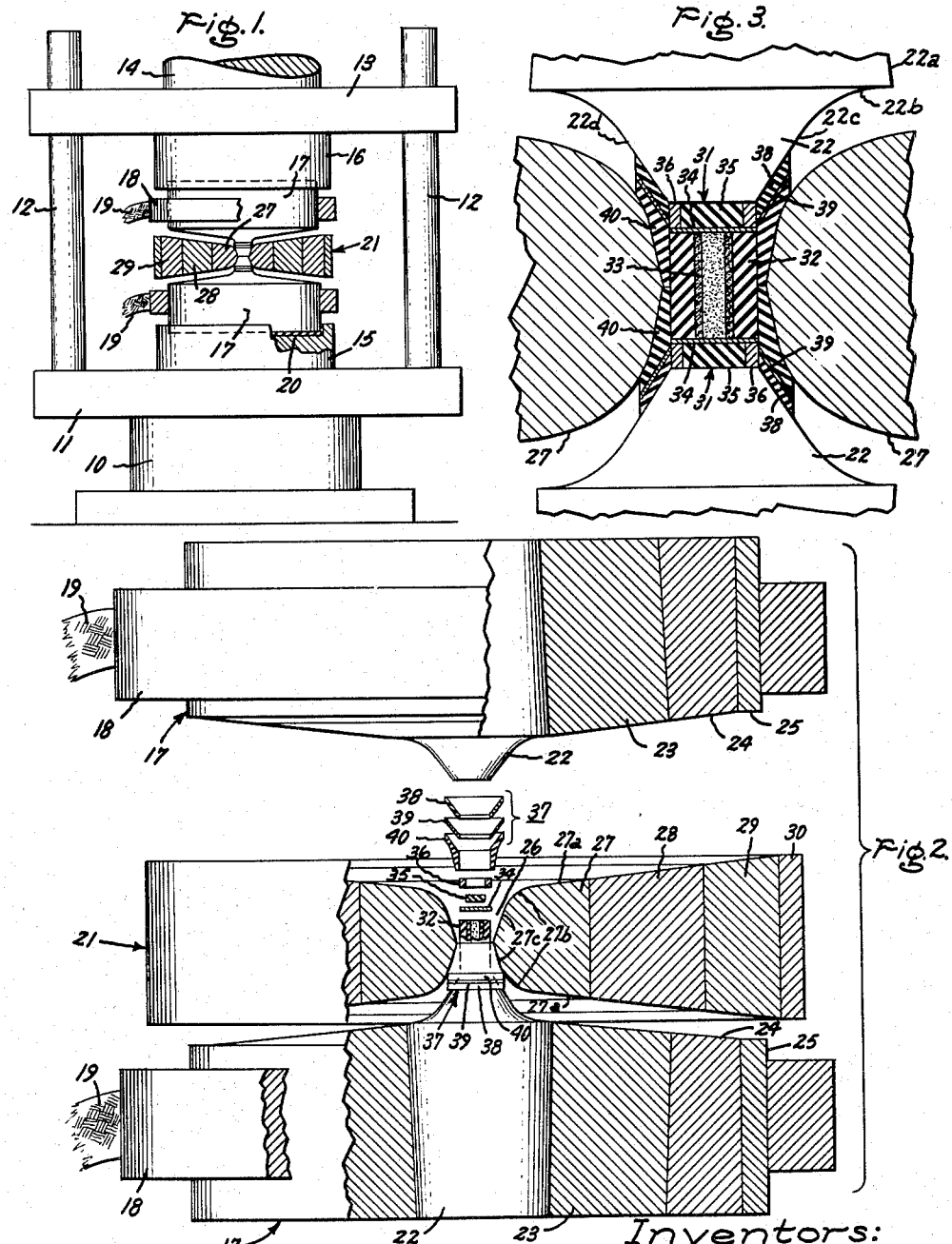

2,947,610

METHOD OF MAKING DIAMONDS

Howard Tracy Hall, Provo, Utah, and Herbert M. Strong and Robert H. Wentorf, Jr., Schenectady, N.Y., assignors to General Electric Company, a corporation of New York Filed Jan. 6, 1958, Ser. No. 707,435

18 Claims. (Cl. 23—209.1)

This application is a continuation-in-part of our copending application Serial No. 633,505, filed January 10, 1957, and now abandoned, which in turn is a continuation-in-part of our copending application Serial No. 488,116, filed February 14, 1955, and now abandoned, both assigned to the same assignee as the present invention.

This invention relates to a method for converting non-diamond carbon into diamond carbon.

In the past, a great deal of effort has been expended in attempts to convert more abundant and less expensive forms of carbon into the diamond form. In connection with these efforts, a great deal of attention has been directed towards speculation as to the method by which diamond is formed in nature. However, no satisfactory explanation of the natural process by which diamond has been formed has ever been given and it is unlikely that the natural process of diamond formation will be understood in the near future.

The need for a readily available source of diamond has arisen because of its increasing usage and the very few known sources of diamond carbon in the world at present. Attempts to prepare diamonds from less expensive forms of carbon in the past, have generally taken the form of attempts to apply heat and pressure to amorphous carbon or graphite to cause a transformation from one allotropic form to another. Attempts have also been made to convert other forms of carbon to diamond by catalytic transformations using various metals and salts as the transformation catalyst. However, despite the great need for success in this field and the intense desires and wishes of the many workers, to date these attempts have been unsuccessful.

An object of this invention is to transform non-diamond carbon into diamond.

A further object of this invention is to convert non-diamond carbon into diamond under the action of extremes of heat and pressure.

A still further object of the present invention is to provide a proved process for converting non-diamond carbon into diamond by the action of heat and pressure in the presence of a metallic catalyst or a material which will yield a metallic catalyst under the extreme pressures and temperatures employed.

We have discovered unexpectedly that the common types of carbon such as coal, coke, charcoal or graphite may be readily and rapidly converted into diamond by a unique process involving specific ranges of temperatures and pressures with a particular group of catalysts. More particularly, we have found that non-diamond carbon may be transformed into diamond by subjecting the carbon to a pressure of at least about 75,000 atmospheres, preferably from about 80,000 to 110,000 atmospheres, and specifically about 95,000 atmospheres while subjecting the compressed material to a temperature of from about 1200 to about 2000° C., and preferably about 1400 to 1800° C. This high temperature-high pressure reaction is conducted in the presence of a catalyst which is a member selected from the class consisting of iron, cobalt, nickel, rhodium, ruthenium, palladium, osmium, iridium, chromium, tantalum, manganese, and compounds of these metals which decompose to a metallic form at the elevated temperatures and pressures employed in this reaction. We have found that diamonds may be formed from non-diamond carbon in a period which varies from a few seconds up to several hours depending on the particular temperature, pressure and catalyst employed.

This invention may be best understood by reference to the following description taken in connection with the drawing in which:

Fig. 1 is a front elevational view, partly in section, of a hydraulic press with a high pressure-high temperature apparatus which may be employed in practicing this invention;

Fig. 2 is an enlarged, exploded sectional view of the high pressure-high temperature apparatus of Fig. 1; and Fig. 3 is an enlarged, sectional view of a portion of the high pressure-high temperature apparatus of Figs. 1 and 2.

The diamonds formed by the process of the present invention have been examined chemically, physically, and by X-ray crystallographic methods and are indistinguishable from those diamonds which occur in nature.

The compounds of the metal catalysts listed above which decompose into pure metals under the temperatures and pressures employed in the present invention include, for example, the carbides, sulfides, carbonyls, cyanides, ferrotungstates, ferritungstates, oxides, nitrides, nitrates, hydrides, chlorides, molybdates, arsenates, acetates, oxalates, carbonates, chromates, phosphides, permanganates, sulfates, tungstates, etc. Specific examples of decomposable compounds usable as catalysts in the present invention include ferrous sulfide, iron carbonyls, palladium chloride, chromium carbide, tantalum hydride, nickel permanganate, cobalt acetate, etc. All of the specific compounds listed above decompose into a metal component at pressures of at least about 75,000 atmospheres and at temperatures of from about 1200 to about 2000° C. in the presence of carbon.

We have found that the proportions of the various ingredients employed in the practice of this invention are not critical so that the ratio of the non-diamond carbon to the catalyst material may be varied within an extremely wide range. We have discovered no limitation on this range. However, we prefer to have present more, by volume, of the carbon than of the catalyst material. The time required for effecting the transformation of the present invention varies somewhat with the particular system employed, but times as low as thirty seconds to three or four minutes have been satisfactory to cause the transformation with all of the systems employed. No disadvantage has been observed in exposing the reactants to the high pressure and high temperature for extended periods of time.

The process of the present invention may be carried out in any type of apparatus capable of producing the pressures required at the temperatures required. However, we prefer to employ apparatus of the type described in the applications of H. T. Hall, Serial No. 488,050, filed February 14, 1955, now abandoned, and Serial No. 707,432, filed concurrently herewith, now U.S. Patent No. 2,941,248, issued June 21, 1960, both assigned to the same assignee as the present invention. This apparatus defines a reaction zone of controllable dimensions in which controllable temperatures and pressures may be obtained and maintained for desired periods of time. The disclosure of these Hall applications is hereby incorporated by reference into the present application. The apparatus disclosed in the aforementioned Hall applications is a high pressure device for insertion between the platens of a hydraulic press. The high pressure device consists of an annular member defining a substantially cylindrical reaction area, and two conical piston-type members or punches designed to fit into the substantially cylindrical portion of the annular member from either side of said annular member. A reaction vessel which fits into the annular member may be compressed by the two piston members to reach the pressures required in the practice of the present invention. The temperature required is obtained by any suitable means, such as, for example, by induction heating, by passing an electrical current (either alternating or direct) through the reaction vessel, or by winding heating coils around the reaction vessel.

The drawing illustrates a specific apparatus which has been successfully employed for maintaining the sustained pressures and temperatures required for the practice of the present invention. In Fig. 1 of the drawing a hydraulic press capable of applying a force of 450 tons comprises a base 10 with a press bed 11 on which are mounted a plurality of vertical shafts 12 to support a movable carriage 13 with a hydraulic shaft 14. A pair of opposed recessed pistons 15 and 16 formed of hard steel on bed 11 and carriage 13 are recessed to partially position punch assemblies 17 therein, each of which punch assembly is provided with an electrical connection in the form of an annular copper conducting ring 18 with a connector 19 to supply electric current from a source of power (not shown) through assemblies 17 to the high temperature-high pressure reaction vessel which is described below. A layer of electrical insulation (laminated phenol formaldehyde impregnated paper) 20 is provided between lower punch assembly 17 and its associated piston 15 to prevent conduction of electrical current through the press. A lateral pressure resisting assembly or belt 21 is positioned between opposed assemblies 17 to provide a multistaging pressure effect.

In Fig. 2 is shown a partially exploded view, partly in section, of the punch assemblies 17 and the lateral pressure resisting assembly 21 of Fig. 1. To facilitate the practice of the present invention by persons skilled in the art, Fig. 2 is drawn to scale with each element of the drawing proportional to its actual size and shape in the specific apparatus successfully employed. In Fig. 2 the outside diameter of punch assemblies 17 is equal to 6 inches. Each punch assembly 17 comprises a punch 22 with surrounding binding rings 23 and 24 with a soft carbon steel safety ring 25 located around binding ring 24. Punch 22 is formed of Carboloy grade 44A cemented carbide which comprises 94 percent tungsten carbide and 6 percent cobalt. This material is more completely described in the publication "Properties of Carboloy Cemented Carbides," April 2, 1951, issued by Carboloy Department, General Electric Company, Detroit, Michigan. Binding rings 23 and 24 are formed of AISI 4142 alloy steel, commercially available, and comprising, by weight, 0.4 to 0.5 percent carbon, 0.71 to 1 percent manganese, 0.4 percent phosphorus, 0.2 to 0.35 percent silicon, 0.8 to 1.1 percent chromium, and 0.15 to 0.25 percent molybdenum. Binding ring 23 is hardened to 50 Rockwell C and binding ring 24 is hardened to a Rockwell C hardness of 40. It is seen from Fig. 2 that the members of punch assembly 17 are slightly tapered on their sides. This taper is employed so as to provide a force fit so that punch 22 is under high compression in the punch assembly. Assembly of these elements is accomplished by first forcing ring 24 into safety ring 25 in a suitable press and subsequently forcing ring 23 into binding ring 24. Finally punch 22 is forced into ring 23.

As is best shown in Fig. 3, which is a scale drawing with the faces 31 of punches 22 having a diameter of 0.350 inch, each punch 22 has a generally cylindrical portion 22A having a diameter of about 1.5 inches and a height of about 2.07 inches. Each punch 22a has a tapered portion having a vertical height of about 0.47 inch which comprises a first frustoconical portion 22b at an angle of about 7° from the horizontal, a curved portion 22c, and a second frustoconical portion 22d which has a slant length of about 0.25 inch and extends at an angle of about 30° from the vertical. Binding ring 23 has an outside diameter of about 3.9 inches, binding ring 24 has an outside diameter of about 5.5 inches, and, as previously mentioned, the outside diameter of soft, safety ring 25 is 6 inches. As best seen in Fig. 2 each punch assembly 17 is flat on one side and tapers gently on the opposite side. This taper is about 7° from horizontal.

As best shown in Figs. 1 and 2, lateral pressure resisting assembly 21, which is positioned between opposed punch assemblies 17, tapers inwardly toward the center to provide an aperture 26 in axial alignment with opposed punches 22. Assembly 21 comprises an inner annular ring 27 formed of the aforementioned Carboloy grade 44A cemented carbide and two concentric binding rings 28 ad 29 formed of AISI 4142 alloy steel. Rings 28 and 29 have Rockwell C hardnesses of 50 and 40, respectively. A soft carbon steel safety ring 30 surrounds outer binding ring 29. Rings 27, 28 and 29 are slightly tapered at their contact faces so as to provide the force fit arrangement previously described in connection with punch assembly 17. The individual rings of lateral pressure resisting assembly 21 are assembled in the same manner as were the various rings of punch assembly 17.

As is best shown in Fig. 2, inner annular ring 27 has an outside diameter of about 2.4 inches, a maximum height of about 1.2 inches, and a minimum inside diameter of about 0.4 inch. Ring 27, which is substantially symmetrical about a horizontal plane, comprises portions 27a which are tapered at an angle of about 7° from horizontal, curved portions 27b, and tapered portions 27c, which taper at an angle of about 11° from the vertical. Binding ring 28 has an outside diameter of about 4.8 inches, binding ring 29 has an outside diameter of about 6.4 inches, and safety ring 30 has an outside diameter of about 6.9 inches. Lateral pressure resisting assembly 21 tapers gently from the area of ring 30 to the area of ring 27 with the taper being equal to about 7° from the horizontal.

As best shown in Fig. 3, punches 22 and ring 27 of lateral pressure resisting assembly 21 define a controllable reaction zone in which material to be subjected to elevated pressures and temperatures is positioned. As previously mentioned, Fig. 3 is a scale drawing with the faces 31 of punches 22 having a diameter of 0.350 inch. All elements in Fig. 3 conform to this scale except elements 33, 34 and 39, whose thicknesses have been exaggerated. The specimen to be subjected to high pressure and high temperature is positioned in a hollow cylindrical reaction vessel 32, which in this specific illustration is formed of pyrophyllite. Reaction vessel 32 has a height of about 0.4 inch, an outside diameter of 0.35 inch, and an inside diameter of 0.125 inch. Pyrophyllite has been chosen as the material of construction for cylindrical reaction vessel 32 for the reasons, among others, that it is readily machinable to the desired shape and is inert to the reactants under the conditions of reaction employed in the practice of the present invention. The specimen to be subjected to elevated pressures and temperatures is then positioned within the central aperture in reaction vessel 32. In this specific illustration the specimen consists of a hollow spectroscopic graphite cylinder 33 having a height of 0.4 inch, a wall thickness of 0.0225 inch and an outside diameter of 0.125 inch. Into cylinder 33 is compacted a mixture of powdered graphite and one or more of the catalysts of the present invention. The reaction vessel 32 is closed or sealed at each end by conducting metal end disks 34 which have a thickness of 0.010 inch and a diameter of 0.350 inch. Positioned adjacent each disk 34 is a disk 35 of pyrophyllite having a diameter of about 0.250 inch and a thickness of about 0.10 inch. An annular conducting ring 36 of AISI 4142 alloy steel having a Rockwell C hardness of 50 surrounds each of the disks 35. Ring 36 has an outside diameter of 0.350 inch and a thickness of 0.10 inch.

Inside of ring 27 of lateral pressure resisting assembly 21 and surrounding reaction vessel 32 and partially surrounding the tapered portion of each punch 22 are gasket assemblies 37, each of which comprises an inner conical pyrophyllite washer 38 having a thickness of 0.030 inch, a slant height of approximately 0.25 inch, and making an angle of 30° with the vertical. Washer 38 is surrounded by a soft carbon steel conical washer 39 having a thickness of approximately 0.010 inch and a slant height of about 0.25 inch and an angle of about 30° with respect to the vertical. Each of washers 40 has an inside diameter at its narrowest portion of 0.35 inch and an outside diameter at its narrowest portion of 0.40 inch. The 0.35 inch inner cylindrical surface of washer 40 has a height of about 0.2 inch. Washer 40 also has a tapered conical interior portion designed to cooperate with the outer surface of washer 39 and which has a taper with respect to the vertical of about 30°. The overall vertical height of washer 40 is approximately 0.43 inch and the outer surface of washer 40 is designed to conform to the shape of that portion of ring 27 with which washer 40 comes into contact.

In the operation of the high pressure-high temperature apparatus of the drawing to produce the pressures and temperatures required in the practice of the present invention, opposed recessed pistons 15 and 16 are attached respectively to pressed bed 11 and carriage 13 by any suitable means (not shown). Insulation layer 20 is then placed in the recess in piston 15 and lower punch assembly 17 is positioned in the recess in piston 15 on top of insulation layer 20. Upper punch assembly 17 is then fastened into the recess in upper recessed piston 16 by suitable means (not shown). Lower gasket assembly 37 is then positioned over lower punch 22, lower insulating disk 35 and conducting ring 36 are then positioned within lower gasket assembly 37 and conducting disk 34 is put in place. Lateral pressure resisting assembly 21 is then positioned around the parts previously assembled. Cylindrical reaction vessel 32, which contains graphite tube 33 and its contents is then added to the assembly. Subsequently, upper conducting disk 34, upper insulating disk 35 and upper conducting ring 36 are put into place. The final operation is the positioning and assembly of upper gasket assembly 37.

Reaction vessel 33 is subjected to the pressures required in the practice of the present invention by applying force to the high pressure-high temperature apparatus by means of shaft 14 of the press. The method of correlating the press load required to produce a given pressure within reaction vessel 33 is discussed below. After the desired pressure is reached the reaction vessel is brought to the desired temperature by electrical resistance heating of the contents of reaction vessel 33. Specifically, electrical current is supplied from one electrical connector, such as upper connector 19 to upper conducting ring 18, upper rings 25, 24, 23, upper punch 22, upper ring 36, upper disk 34, and to the graphite tube 33 and its contents. The electrical path from the bottom of tube 33 to lower connector 19 is similar to the conducting path described above. After the reaction vessel has been held at the desired pressure and temperature for the desired time, the electrical current to the reaction vessel is cut off and the pressure is released. Diamonds which have been formed are then removed from the reaction vessel.

The reaction vessel or cylinder 32, described above as being formed of pyrophyllite, may also be formed of any of the conventional metals of construction or of graphite. Where the reaction vessel is constructed of a metal it is convenient to employ one of the metals which acts as a catalyst in the process of the present invention. This vessel may be filled with non-diamond carbon and compressed so that the metal present in the vessel will serve as a catalyst for the transformation to diamond. Where the reaction chamber or vessel is formed of graphite, it may be filled with catalyst material and the compression of the graphite vessel with the catalyst at the pressures required by the present invention results in the transformation into diamond. Regardless of the material of construction of the reaction vessel the non-diamond carbon and the catalyst may be admixed inside the vessel. Thus, mixtures of powdered graphite and metal or metal compounds may be employed as the charge in the reaction vessel and compression of the vessel and charge at the required temperature effects the transformation to diamond.

In the preferred embodiment of our invention we employ a reaction vessel comprising a cylinder of pyrophyllite surrounding a cylinder of graphite having a hollowed-out cylindrical center portion, the axis of the center portion being coaxial with the axis of the reaction vessel. Into this graphite cylinder is placed a powdered mixture of graphite and the catalyst employed. This reaction vessel is sealed at its ends by metallic disks which may or may not act as a catalyst for the reaction depending on their composition. Plugs of non-diamond carbon or metal may be placed in the ends of the reaction vessel before sealing. This sealed reaction vessel is then placed in the apparatus described in the above-mentioned Hall application and subjected to the elevated temperature and the pressure required to effect the transformation to diamond. Alternatively, instead of employing a reaction vessel, a cylinder of carbonaceous material, such as graphite, may be sandwiched between two disks formed of a metal which may act as a catalyst for the transformation and the sandwich placed in the pressure apparatus and subjected to the conditions required to cause the transformation to diamond. As a further alternative a metallic reaction vessel may be sealed with carbonaceous material in powder or solid form and the catalyst for the reaction may be supplied by admixing it with the powdered carbon or by forming end disks to seal the reaction vessel and subjecting this assembly to high pressures and temperatures. A reaction "vessel" may be formed by compressing a mixture of non-diamond carbon and the catalyst material until a cylinder is formed which fits into the substantially cylindrical aperture described in the Hall apparatus. Again this latter apparatus may be employed in the usual manner at elevated temperatures and pressures to effect the transformation.

In preparing diamond by the method of the present invention it is difficult to measure the pressure and temperature to which the reactants are subjected by direct means because of the extreme pressure employed. Therefore, each of these conditions is measured by indirect means. In measuring the pressure, recognition is made of the fact that certain metals undergo distinct changes in electrical resistance at particular pressures. Thus, bismuth undergoes a phase change which results in a change in electrical resistance at 24,800 atmospheres, thallium undergoes such a phase change at 43,500 atmospheres, cesium undergoes such a change at 53,500 atmospheres, and barium undergoes such a change at 77,400 atmospheres. We have found that the melting point of germanium varies directly with pressure over an extremely wide pressure range, including pressures up to and above 110,000 atmospheres and it is known that the electrical conductivity (and resistance) of germanium undergoes a marked change in the transition of germanium from the liquid to the solid phase. Thus, by determining the hydraulic press load necessary to cause a phase change in a metal such as bismuth a point on a pressure-press load curve is determined. By filling a reaction vessel in the Hall apparatus with germanium and applying the same press load employed to obtain the phase change in bismuth, and by then heating the germanium to the temperature at which the germanium melts (as measured by a large decrease in electrical resistivity) a point on a pressure-melting point curve for germanium is determined. By carrying this same operation out with other metals such as thallium, cesium and barium, whose phase change points are known, a series of points on a melting point-pressure curve for germanium are obtained. We have found that this melting point-pressure curve is a straight line. Therefore, by applying other press loads with the hydraulic press apparatus while the reaction chamber is filled with germanium and determining the melting point of the germanium at the different press loads, the actual pressure in the chamber at a given press load is determined. The phase changes recited for the above metals were the standards for determining the pressures employed in the practice of our invention and are the basis for the pressures recited in the appended claims.

The temperature in the reaction vessel is determined by fairly conventional means such as by placing a thermocouple junction in the reaction vessel and measuring the temperature of the junction in the usual manner. We have found that one suitable method of positioning a thermocouple in the apparatus for the measurement of temperature is to run a pair of thermocouple wires between outer pyrophyllite gasket 40 and lateral pressure resisting assembly 21. These wires then pass through the joint between upper and lower gasket assemblies 37 and through holes drilled in reaction vessel 32 with the thermocouple junction being positioned inside of the reaction vessel. When a graphite cylinder 33 is employed, the thermocouple also passes through a hole drilled through this cylinder. The material to be subjected to the elevated pressure and temperature is then compacted into the cylindrical aperture defined by reaction vessel 33 and the apparatus is assembled and subjected to a high pressure, such as a pressure of 2,000 to 100,000 atmospheres. Electrical energy at a predetermined rate is then supplied the apparatus and the temperature produced by this power is measured by the thermocouple assembly. This same procedure is repeated a number of times with different power inputs to produce a calibration curve of power input versus temperature in the reaction vessel. After calibration of the apparatus by this method, the temperature of the contents of the reaction vessel is determined by the power input to the apparatus in conjunction with the calibration curve. In general, to produce a temperature of about 1600° C. in the apparatus specifically illustrated, an alternating current voltage of from about 1 to 3 volts at a current up to about 800 amperes is used to deliver the required 700 to 800 watts through the contents of reaction vessel 32.

The temperature of the reaction chamber may also be determined by measuring the resistance of heating coils, such as platinum heating coils, wound around the reaction chamber. The temperature of platinum is determined from its well known temperature coefficient of resistance. Thus, the temperature within the reaction vessel is determined by relatively simple means during the course of the reaction and the pressure within the vessel is read from a plot of the relationship between the force applied by the platens of the press to the pressure within the reaction vessel.

The temperatures measured by the methods above and referred to throughout this application are the temperatures in the hottest portion of the reaction vessel. It should be understood, however, that the temperature may vary over a range of 100 to 200° C. between spaced points in the reaction vessel.

The following examples are illustrative of the practice of our invention and are not intended for purposes of limitation.

In Examples 1 to 15, which follow, the specific apparatus illustrated in the drawing and alternating current heating were employed. In all cases the graphite cylinder or tube 33 was packed fully with either spectroscopic or reactor grade graphite with or without a catalyst. In all of the examples the parts of the ingredients which make up the charge are given in terms of parts by volume. The apparatus employed in Examples 16 to 22 differed from the apparatus illustrated in the drawing by the elimination of graphite cylinder or tube 33.

In all of the examples the diamonds formed were examined by at least one of the following methods to make sure that the product formed was actually diamond: X-ray crystallography, refractive index, density, chemical analysis, infra-red analysis, and hardness tests. The diamonds were removed from the matrix in which they formed by dissolving the matrix in fuming red nitric acid.

EXAMPLE 1

A cylindrical graphite tube 33 having an annular cross-section was filled with five parts powdered graphite, one part powdered iron, one-third part manganese, and one-third part vanadium pentoxide. This cylindrical tube was sealed with a graphite end plug at the top and a tantalum disk 34 at each end. This tube was placed in the apparatus described and heated under a pressure of about 95,000 atmospheres at a temperature of about 1700° C. for about two minutes and then cooled to about 1500° C. in eight additional minutes. This resulted in a plurality of diamonds having a great variety of octahedral faces and corners. These diamonds were separated from the matrix in which they were formed by solution of the matrix in fuming red nitric acid. X-ray diffraction patterns obtained from diamonds prepared in this experiment by taking a Debye-Scherrer photograph in a cylindrical camera of 5 cm. radius with a $CuK_a$ radiation showed overwhelmingly that diamonds had been formed. The interplanar spacings ($d$ in Angstrom units) measured from these photographs are compared with the theoretical values for diamonds in the table below.

*Interplanar spacing (d in Angstrom units)*

| Plane | Measured | Natural Diamond |
|---|---|---|
| (111) | 2.05 | 2.060 |
| (220) | 1.26 | 1.262 |
| (311) | 1.07 | 1.076 |
| (400) | 0.89 | 0.8920 |
| (331) | 0.82 | 0.8185 |

The refractive indices of a number of diamonds formed in this example were measured in white light and found to be in the range of 2.40 to 2.50. The refractive index of natural diamond chips, examined simultaneously, also lay in the range of 2.40 to 2.50. Several samples of diamonds prepared in this example were analyzed for carbon by micro-combustion. The results were 86 percent carbon and 81 percent carbon in two runs. Iron, aluminum, silicon, manganese, and vanadium were present in both residues and one residue also contained a trace of tantalum. This compares with natural diamonds which are carbon crystals of varying purity and may contain up to 20 percent ash consisting mainly of oxides of silicon, iron, calcium, magnesium, aluminum, and titanium. The diamonds prepared in this example were found to scratch polished boron carbide plate.

EXAMPLE 2

A graphite tube as described above was loaded with a mixture of one part, by volume, of nickel powder and three parts, by volume, of graphite powder. The ends of the tube were sealed with tantalum disks and the tube was exposed to a pressure of 95,000 atmospheres at a temperature of about 1700° C. for six minutes. Examination of the reaction mixture showed many small diamonds.

EXAMPLE 3

The procedure of Example 2 was repeated with the exception that manganese powder was substituted for the nickel powder. This also resulted in many diamonds in the reaction mixture. This procedure was also followed to produce diamonds in a graphite tube filled with four parts of graphite powder and one part of palladium chips.

EXAMPLE 4

Following the general procedure of Example 2, a graphite tube was charged with two parts of graphite powder and one part of cobalt powder with tantalum end disks. Diamonds were formed after the reaction chamber had been heated at 1700° C. under a pressure of 95,000 atmospheres for two minutes and then cooled under the same pressure to 1400° C. in twelve additional minutes.

EXAMPLE 5

A graphite cylinder had its central third filled with sodium metal and the end thirds with graphite powder. This cylinder was sealed with tantalum end disks and subjected to a pressure of 95,000 atmospheres at a temperature of from 1500 to 2000° C. for a period of from about five to ten minutes. This resulted in a plurality of relatively small diamonds. Following this same procedure diamonds were formed using chromium in place of the sodium.

EXAMPLE 6

Diamonds were formed by filling a graphite tube with graphite powder and sealing the ends with tantalum disks. This sealed tube was then subjected to the same pressure and temperature conditions for the same time as was done in Example 5, yielding several diamonds.

EXAMPLE 7

Diamonds were formed from graphite and iron by filling a cylindrical graphite tube with a mixture of 98 parts of powdered graphite and two parts of powdered iron. This tube was sealed with tantalum end disks and was subjected to a pressure of about 95,000 atmospheres at 1800° C. for about two minutes, then cooled in eleven minutes more to 1400° C.

EXAMPLE 8

The procedure of Example 6 was followed except that the charge to the graphite tube consisted of a mixture of three parts powdered graphite and one part powdered vanadium pentoxide. After exposing this tube vessel to the conditions of Example 6 a plurality of diamonds had formed.

EXAMPLE 9

Diamonds were formed under the physical conditions described in Example 5 by filling a cylindrical graphite tube with a mixture of four parts of potassium pyrosilicate monohydrate, four parts of an equimolar mixture of iron and ferric oxalate dihydrate, and one part of carbon black. One end of this tube was closed with a graphite plug and both ends were sealed with tantalum disks.

EXAMPLE 10

Diamonds were formed under the conditions of pressure, temperature and time described in Example 6 employing a cylindrical graphite tube filled with fifteen parts of powdered graphite, three parts of powdered iron, one part powdered manganese, and one part of powdered vanadium pentoxide with the ends of the tube sealed with tantalum disks.

EXAMPLE 11

Diamonds were formed by subjecting a cylindrical graphite tube to a pressure of 95,000 atmospheres at a temperature of about 1900° C. for three minutes and then at a temperature which decreased down to about 1400° C. in eleven additional minutes. This graphite tube was filled with a mixture of five parts graphite powder, two parts iron powder, and one part manganese powder with the ends of the tube closed with tungsten disks. Diamonds were also formed when this experiment was repeated except that titanium end disks were used instead of tungsten and a small piece of pyrophyllite (wonderstone) was placed in the tube near the top end.

EXAMPLE 12

A cylindrical graphite tube was filled with a mixture of 92 parts graphite powder, five parts iron powder, and three parts of manganese powder. After sealing with tantalum end disks, the tube was subjected to a pressure of 95,000 atmospheres during which time it was maintained at 1700° C. for two minutes and then cooled to 1200° C. in about twenty minutes.

EXAMPLE 13

Following the procedure of Example 2, diamonds were formed by filling a cylindrical graphite tube with a mixture of two parts iron powder, one part manganese powder, and two parts of fine copper powder (containing cuprous oxide) and eighteen parts graphite. This tube was maintained at a pressure of 95,000 atmospheres while heated at 1700° C. for two minutes and cooled to 1400° C. in twenty-one additional minutes.

EXAMPLE 14

Diamonds were formed in a cylindrical graphite tube filled with ferrous sulfide and sealed with tantalum disks. This tube was subjected to a pressure of 95,000 atmospheres at 1620° C. for two minutes and then allowed to cool over a ten minute period under pressure.

EXAMPLE 15

Diamonds were formed in a graphite tube which contained an iron rod surrounded by powdered graphite and which was sealed with platinum end disks. This tube was subjected to 95,000 atmospheres at a temperature of 1450° C. for four minutes and then allowed to cool under pressure for ten minutes.

EXAMPLE 16

This example illustrates the conversion of graphite to diamond employing nickel as a catalyst. In this example, diamonds were formed employing a number of different pressures and a number of different temperatures. The sample comprised a nickel wire surrounded by a graphite sleeve with this sleeve being inserted into the opening in a hollow pyrophyllite cylinder. Nickel end disks were placed at each end of the assembly with the nickel disks in contact with the nickel wire. The reaction vessel assembly thus formed was heated by passing an electric current through the nickel end disks and the central nickel wire. In each run, this assembly was brought to the desired pressure and then brought to reaction temperature in two or three seconds, held at the reaction temperature for about three minutes and then cooled in about three additional seconds. The table below lists the pressure employed and the temperatures employed in forming diamonds.

| Approximate Pressure, Atm. | Approximate Temperature, ° C. |
|---|---|
| 105,000 | 1,750 |
| 100,000 | 1,650 |
| 81,000–83,000 | 1,700 |
| 75,000 | 1,650 |

EXAMPLE 17

Manganese was employed as the catalyst in converting graphite to diamond in a reaction vessel comprising a hollow cylinder of pyrophyllite. Into the central portion of this cylinder was placed a carbon rod with the remainder of the cylindrical opening being sealed with manganese rods. Tantalum end disks were then placed around this assembly. When this assembly was heated at a temperature of about 1600° C. and a pressure of about 95,000 atmospheres for three minutes, graphite was converted to diamond in the area of the interface between the graphite and the manganese.

EXAMPLE 18

Following the procedure of Example 17, palladium was employed in place of manganese as the diamond-forming catalyst. When this assembly was subjected to about 105,000 atmospheres at a temperature of about 1800° C. for about three minutes, diamonds were formed at the interface between the carbon and the palladium.

EXAMPLE 19

The procedure of Example 18 was repeated except that ruthenium was substituted for the palladium and molybdenum end disks were substituted for the tantalum end disks. Again diamond formed at the interface between the carbon and the ruthenium.

EXAMPLE 20

The procedure of Example 17 was repeated employing cobalt in place of the manganese and employing a temperature of about 1800° C. rather than about 1600° C. This resulted in the formation of diamond at the interface between the graphite and the cobalt.

EXAMPLE 21

The procedure of Example 17 was repeated employing rhodium in place of the manganese at about 100,000 atmospheres and about 1900° C., yielding a number of diamonds at the interface between the rhodium and the graphite.

EXAMPLE 22

The procedure of Example 20 was repeated except that chromium was substituted for the cobalt. This resulted in a plurality of diamonds at the interface between the chromium and the graphite.

While the foregoing examples disclose the use of separate source materials for the non-diamond carbon and for the catalyst employed in the present invention, it should be understood that naturally occurring materials which contain both non-diamond carbon and at least one of the catalysts described above may be transformed to diamond under the conditions described. Examples of such naturally occurring materials include certain anthracite and bituminous coals having a high mineral content, graphitic carbon having a high mineral content, etc.

Since diamonds prepared by the method of this invention are indistinguishable from natural diamonds, they have the same utility as natural diamonds, e.g., as gems for use in jewelry and other ornamental articles, as the cutting edge of a glass cutter, as the abrasive ingredient in abrasion wheel formulations, etc.

The use of alloys for converting carbonaceous materials to diamond at elevated temperatures and pressures is more particularly disclosed and claimed in the copending application of Herbert M. Strong, Serial No. 707,433, filed January 6, 1958, and assigned to the same assignee as the present invention.

What we claim as new and desire to secure by Letters Patent of the United States is:

1. The method of synthetically making diamonds which comprises (1) combining a carbonaceous material with a catalyst material selected from the class consisting of iron, cobalt, nickel, rhodium, ruthenium, palladium, osmium, iridium, chromium, tantalum, and manganese, (2) subjecting the aforesaid carbonaceous material and catalyst material in the diamond forming region to a pressure of at least about 75,000 atmospheres at a temperature of from about 1200° to about 2000° C., and (3) recovering the diamond formed.

2. The method of claim 1 in which the pressure is from about 80,000 atmospheres to 110,000 atmospheres.

3. The method of claim 1 in which the pressure is about 95,000 atmospheres.

4. The method of claim 1 in which the catalyst is iron.

5. The method of claim 1 in which the catalyst is nickel.

6. The method of claim 1 in which the catalyst is cobalt.

7. The method of claim 1 in which the catalyst is manganese.

8. The method of claim 1 in which the carbon is employed in its amorphous form.

9. The method of claim 1 in which the carbon is used in its graphitic form.

10. The method of synthetically making diamonds which comprises (1) combining graphite with iron as a catalyst, (2) subjecting the said graphite and iron in the diamond forming region to a pressure of at least about 95,000 atmospheres at a temperature of from about 1200° to about 2000° C., and (3) recovering the diamond formed.

11. The method of synthetically making diamonds which comprises (1) combining graphite with tantalum as a catalyst, (2) subjecting the said graphite and tantalum in the diamond forming region to a pressure of at least about 95,000 atmospheres at a temperature from about 1200° to about 2000° C., (3) isolating the diamond formed.

12. The method of synthetically making diamonds which comprises (1) combining graphite with cobalt as a catalyst, (2) subjecting the graphite and cobalt in the diamond forming region to a pressure of at least about 95,000 atmospheres at a temperature of from about 1200° to about 2000° C., and (3) recovering the diamond formed.

13. The method of synthetically making diamonds which comprises (1) combining graphite with nickel as a catalyst, (2) subjecting the said graphite and nickel in the diamond forming region to a pressure of at least about 95,000 atmospheres at a temperature of from about 1200° to about 2000° C., and (3) thereafter recovering the diamond formed.

14. The method of synthetically making diamonds which comprises (1) combining graphite with manganese as a catalyst, (2) subjecting the graphite and manganese in the diamond forming region to a pressure of at least about 95,000 atmospheres at a temperature of from about 1200° to about 2000° C., and (3) recovering the diamond formed.

15. The method of making diamonds which comprises (1) defining a reaction zone, (2) positioning in said reaction zone a mixture of non-diamond carbon and a metal selected from the class consisting of iron, cobalt, nickel, rhodium, ruthenium, palladium, osmium, iridium, chromium, tantalum, and manganese, (3) subjecting said mixture to a pressure of at least about 75,000 atmospheres at a temperature of from about 1200 to 2000° C. until said non-diamond carbon is converted to diamond, and (4) removing said mixture from said reaction zone and (5) recovering the diamonds formed from said mixture.

16. The method of making diamonds which comprises positioning in a graphite tube a mixture of non-diamond carbon and a metal selected from the class consisting of iron, cobalt, nickel, rhodium, ruthenium, palladium, osmium, iridium, chromium, tantalum, and manganese, subjecting said tube and its contents to a pressure of at least about 75,000 atmospheres at a temperature of from about 1200 to 2000° C. until said non-diamond carbon is converted to diamond, and removing said formed diamonds from the matrix in which the diamonds were formed.

17. The method of making diamonds which comprises confining in an inert container a mixture of non-diamond carbon and a metal selected from the class consisting of iron, cobalt, nickel, rhodium, ruthenium, palladium, osmium, iridium, chromium, tantalum, and manganese, subjecting said mixture to a pressure of at least about 75,000 atmospheres at a temperature of from about 1200 to 2000° C. until said non-diamond carbon is converted to diamond and recovering said formed diamonds from said inert container and from the matrix in which said diamonds are formed.

18. The method as in claim 1 in which the catalyst material is employed with the carbonaceous material in the form of a compound of said metal in which the metal is present as an ion therein whereby the compound is decomposable to the metal state under the conditions of reaction recited in section (2) of claim 1.

References Cited in the file of this patent

UNITED STATES PATENTS

| | | |
|---|---|---|
| 2,483,803 | Bridgman | Oct. 4, 1949 |
| 2,544,414 | Bridgman | Mar. 6, 1951 |

FOREIGN PATENTS

| | | |
|---|---|---|
| 337,239 | Great Britain | July 21, 1932 |

OTHER REFERENCES

Liander: "ASEA Journal," vol. 28, pp. 97, 98, May-June 1955.

Parsons: "Phil. Trans. of the Royal Society," Series A, pp. 67–77, 92–101 (1919).

Gunther: "Z. Anorg. Allgem. Chem.," vol. 250, pp. 357–372 (1943).

Bridgman: "J. of Chem. Physics," vol. 15, No. 2, pp. 92–98, February 1947.

D. P. Mellor: "Research," vol. 2, No. 7, pp. 314–318, July 1949.

Henry: Washington, D.C., "Evening Star," p. A–3, Feb. 15, 1955.

Neuhaus: "Angew. Chem.," vol. 66, pp. 525–536, Sept. 7, 1954.

Peiser et al.: "X-Ray Diffraction by Polycrystalline Materials," pp. 500 and 501 (1955).

Henry et al.: "The Interpretation of X-Ray Diffraction Photographs," pp. 219, 221 (1951), Macmillan & Co. Ltd., St. Martins St., London.

Azaroff et al.: "The Powder Method," p. 1 (1958), McGraw-Hill Book Co.

Kuss: "Chemie-Ingenieur Technik," vol. 28, No. 3, pp. 141–152, March 1956.